Oct. 4, 1949. T. VAN DER NEUT 2,483,681
OVEN
Filed July 14, 1947
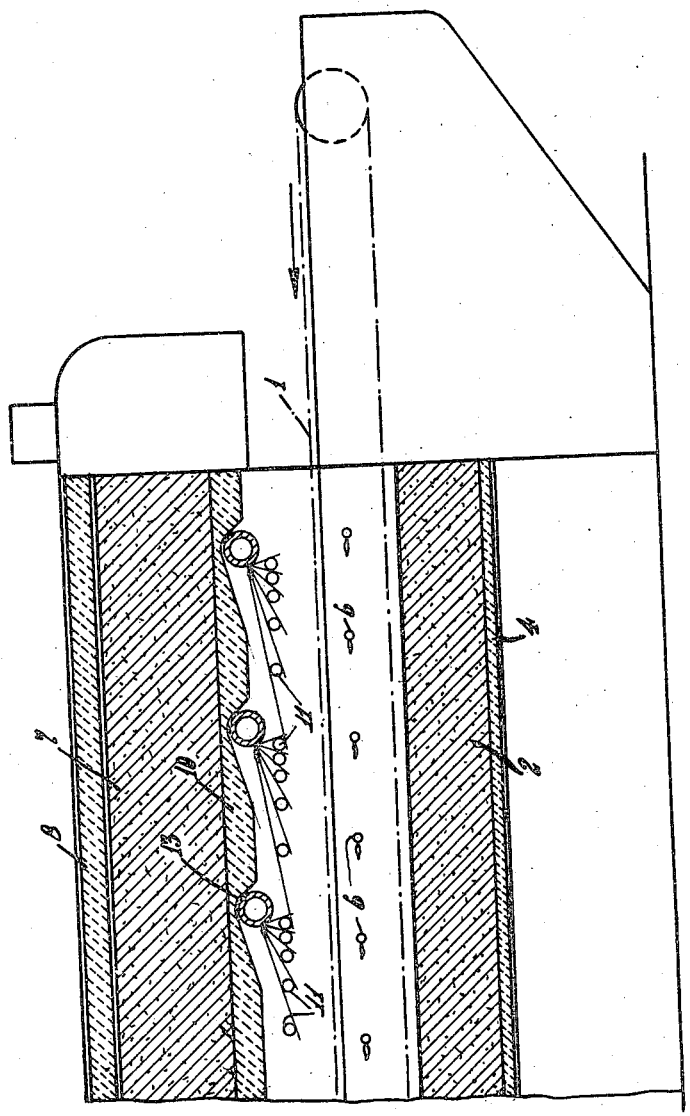
Inventor:
T. van der Neut
By E. F. Wenderoth
atty Patented Oct. 4, 1949

2,483,681

UNITED STATES PATENT OFFICE 2,483,681

OVEN

Teunis van der Neut, Dordrecht, Netherlands, assignor to Bakovenbouw voorheen H. P. den Boer N. V., Dordrecht, Netherlands, a corporation of the Netherlands Application July 14, 1947, Serial No. 760,835
In the Netherlands January 21, 1946

Section 1, Public Law 690, August 8, 1946
Patent expires January 21, 1966

1 Claim. (Cl. 263—43)

The invention relates to an oven provided with gas-burners or other heating elements located in the upper portion of the baking chamber, the direct radiation of which burners or elements towards the goods to be baked is screened by bodies running transversely of the oven below the rows of heating elements and parallel thereto.

Such a screen involves the danger that the oven gases and the steam resulting from the baking process cannot commingle with the very hot combustion gases of the burners to a sufficient extent so that the temperature in the space where the burners are located becomes too high and they may be burnt.

This danger is enhanced still more if the screening bodies have the capacity of accumulating heat, which would result in the temperature at the side of the burners becoming considerably higher than at the side of the goods to be baked.

According to the invention the screening bodies have the shape of bars which are so located in respect of one another and of the burners that the rays which strike the upper side of a bar will strike or intersect the next bar at the lower side so that the goods to be baked are screened to a degree not larger than required to protect them from direct radiation.

In the drawing an embodiment of the invention is represented by a diagrammatic longitudinal section of a portion of an oven.

The floor of the oven is formed by an endless chain or belt 1 indicated in the drawing by a dot and dash line.

At the underside the oven is closed by a layer of insulating material 2, the lower side of which rests on a wall 4. In the space below the upper run of the chain, burners 6 are disposed.

At the top the oven is likewise closed by a layer of insulating material 7 which at the upper side is covered by a closed wall 8 and which rests on a wall 10 forming the roof of the oven.

In the under face of the wall 10 gutter-shaped recesses running transversely of the oven are made, in which gas-burners 13 are disposed. Below these burners transverse bars 11 are located.

As clearly appears from the drawing the transverse bars 11 irradiated by the burners 13 are arranged in respect of the burners and in respect of one another in such a manner that the rays striking the upper side of a transverse bar, strike or intersect the next transverse bar at the lower side.

I claim:

A baking oven having a baking chamber therein, the upper wall of said baking chamber having gutter-shaped recesses therein extending transversely of said chamber, gas burner elements arranged in said recesses longitudinally thereof, said burner elements having gas openings therein arranged at an angle from a vertical plane through said elements, screening means below said burner elements, said screening means comprising a series of bars parallel to said burner elements, said bars being arranged in close relationship immediately below said elements and being gradually spaced farther apart in the direction of the gas openings in said elements the farther removed said bars are arranged from said elements whereby direct rays of heat from said burners are substantially completely intercepted by said bars.

TEUNIS VAN DER NEUT.

REFERENCES CITED

The following references are of record in the file of this patent:

UNITED STATES PATENTS

| Number | Name | Date |
|---|---|---|
| 1,637,659 | Sacerdote | Aug. 2, 1927 |
| 1,663,116 | Comstock | Mar. 20, 1928 |
| 1,948,440 | Crosland | Feb. 20, 1934 |
| 2,141,139 | Howe et al. | Dec. 20, 1938 |